US012697791B2

(12) United States Patent
Giraud

(10) Patent No.: US 12,697,791 B2
(45) Date of Patent: Aug. 4, 2026

(54) MOULDING APPARATUS

(71) Applicant: CENTRE TECHNIQUE INDUSTRIEL DE LA PLASTURGIE ET DES COMPOSITES, Bellignat (FR)

(72) Inventor: Damien Giraud, La Motte Servolex (FR)

(73) Assignee: CENTRE TECHNIQUE INDUSTRIEL DE LA PLASTURGIE ET DES COMPOSITES, Bellignat (FR)

( * ) Notice: Subject to any disclaimer, the term of this patent is extended or adjusted under 35 U.S.C. 154(b) by 259 days.

(21) Appl. No.: 18/577,184

(22) PCT Filed: Jul. 6, 2022

(86) PCT No.: PCT/FR2022/051356
§ 371 (c)(1),
(2) Date: Jan. 31, 2024

(87) PCT Pub. No.: WO2023/281217
PCT Pub. Date: Jan. 12, 2023

(65) Prior Publication Data
US 2024/0300192 A1 Sep. 12, 2024

(30) Foreign Application Priority Data
Jul. 6, 2021 (FR) ...................................... 2107280

(51) Int. Cl.
B29C 70/46 (2006.01)
B29C 33/04 (2006.01)
(Continued)

(52) U.S. Cl.
CPC ............ B29C 70/462 (2013.01); B29C 33/04 (2013.01); B29C 33/306 (2013.01);
(Continued)

(58) Field of Classification Search
CPC ... B29C 33/306; B29C 33/04; B29C 33/0011; B29C 70/46; B29C 35/007; B29C 2035/082; B29C 2043/144; B29C 33/305
See application file for complete search history.

(56) References Cited

U.S. PATENT DOCUMENTS 4,098,943 A * 7/1978 Degginger .............. B32B 27/20
156/324
4,298,324 A 11/1981 Soulier
(Continued)

FOREIGN PATENT DOCUMENTS

AT 504784 A4 8/2008
EP 0567387 A1 10/1993
(Continued)

OTHER PUBLICATIONS

International Search Report for International Application No. PCT/ FR2022/051356; Mailing Date, Sep. 13, 2022 (English) 2 pages.
(Continued)

*Primary Examiner* — Matthew J Daniels
(74) *Attorney, Agent, or Firm* — CANTOR COLBURN LLP

(57) ABSTRACT

The present disclosure concerns a molding apparatus including:
a first thermally conductive flange and a second thermally conductive flange, said first and second thermally conductive flanges delimiting a cavity configured to receive thermoplastic pre-impregnated textiles,
a mold thermally conductive and thermoregulated by a heat transfer fluid—comprising an upper impression and a lower impression, said upper and lower impressions being configured to receive said first and second thermally conductive flanges.

20 Claims, 7 Drawing Sheets

(51) Int. Cl.
    *B29C 33/30*         (2006.01)
    *B29C 35/00*         (2006.01)
    *B29C 35/08*         (2006.01)
    *B29C 35/02*         (2006.01)

(52) U.S. Cl.
    CPC ........ *B29C 35/007* (2013.01); *B29C 35/0805*
    (2013.01); *B29C 2035/0283* (2013.01); *B29C*
    *2035/0822* (2013.01)

(56) References Cited

U.S. PATENT DOCUMENTS

| | | | |
|---|---|---|---|
| 5,047,198 A * | 9/1991 | Kim | B29C 33/02 |
| | | | 425/89 |
| 5,139,407 A * | 8/1992 | Kim | B29C 35/16 |
| | | | 264/491 |
| 5,338,177 A | 8/1994 | Le | |
| 5,410,132 A | 4/1995 | Gregg et al. | |
| 5,645,744 A * | 7/1997 | Matsen | B29C 66/91443 |
| | | | 219/645 |
| 5,989,008 A | 11/1999 | Wytkin | |
| 6,091,063 A | 7/2000 | Woods | |
| 6,491,855 B1 | 12/2002 | Harper | |
| 7,419,631 B2 | 9/2008 | Guichard et al. | |
| 7,679,036 B2 | 3/2010 | Feigenblum et al. | |
| 2003/0075259 A1 | 4/2003 | Graham | |
| 2004/0058027 A1 | 3/2004 | Guichard et al. | |
| 2007/0063378 A1* | 3/2007 | O'Donoghue | B29C 33/40 |
| | | | 425/406 |
| 2008/0110575 A1 | 5/2008 | Graham | |
| 2008/0261046 A1 | 10/2008 | Husler | |
| 2009/0071217 A1* | 3/2009 | Matsen | B21D 37/16 |
| | | | 219/618 |
| 2009/0294053 A1 | 12/2009 | Graham | |
| 2010/0181018 A1 | 7/2010 | Walczyk et al. | |
| 2010/0201040 A1 | 8/2010 | Guichard et al. | |
| 2011/0017386 A1 | 1/2011 | Bouvet et al. | |
| 2011/0233826 A1 | 9/2011 | Guichard et al. | |
| 2011/0256257 A1 | 10/2011 | Hughes | |
| 2012/0038081 A1 | 2/2012 | Kendall | |
| 2012/0135219 A1 | 5/2012 | Graham | |
| 2012/0247655 A1 | 10/2012 | Erb et al. | |
| 2013/0113141 A1 | 5/2013 | Soerensen | |
| 2015/0202800 A1 | 7/2015 | Luquain | |
| 2019/0202148 A1 | 7/2019 | Feigenblum | |
| 2020/0016852 A1 | 1/2020 | Jung et al. | |
| 2020/0180240 A1 | 6/2020 | Echle et al. | |

FOREIGN PATENT DOCUMENTS

| | | |
|---|---|---|
| EP | 1238785 A1 | 9/2002 |
| EP | 1728411 A1 | 12/2006 |
| EP | 1894442 A1 | 3/2008 |
| EP | 2349667 A1 | 8/2011 |
| EP | 2498965 A1 | 9/2012 |
| EP | 2505327 A1 | 10/2012 |
| EP | 2694277 A2 | 2/2014 |
| EP | 2777908 A1 | 9/2014 |
| EP | 3455044 A1 | 3/2019 |
| FR | 2402526 A1 | 4/1979 |
| FR | 2667013 A1 | 3/1992 |
| FR | 2816237 A1 | 5/2002 |
| FR | 2941642 B1 | 8/2011 |
| JP | 2004148398 A | 5/2004 |
| WO | 9614196 A1 | 5/1996 |
| WO | 0038905 A1 | 7/2000 |
| WO | 0194089 A1 | 12/2001 |
| WO | 2005095091 A1 | 10/2005 |
| WO | 2009007077 A1 | 1/2009 |
| WO | 2010046582 A1 | 4/2010 |
| WO | 2011029276 A1 | 3/2011 |
| WO | 2011133697 A1 | 10/2011 |
| WO | 2014020292 A1 | 2/2014 |

OTHER PUBLICATIONS

International Search Report for International Application No. PCT/FR2022/051356; Mailing Date, Sep. 13, 2022 (Non-English) 7 pages.

Written Opinion for International Application No. PCT/FR2022/051356; (Non-English) 8 pages.

\* cited by examiner

MOULDING APPARATUS

CROSS REFERENCE TO RELATED APPLICATIONS

This application is a National Stage of PCT Application No. PCT/FR2022/051356 filed on Jul. 6, 2022, which claims priority to French Patent Application No. 21/07280 filed on Jul. 6, 2021, the contents each of which are incorporated herein by reference thereto.

TECHNICAL FIELD

The present disclosure concerns a molding apparatus, a system for manufacturing thermoplastic composites and a method for manufacturing thermoplastic composites.

BACKGROUND

The current methods for manufacturing thermoplastic composites from thermoplastic pre-impregnated textiles are based on the principle of thermocompression. The thermocompression comprises pressurizing the thermoplastic pre-impregnated textiles at high temperatures. However, the thermocompression method has the disadvantage of having a low productivity due in particular to a long cycle time. Indeed, the speed of the rise and drop in temperature in this method is very low.

It is known to heat thermoplastic pre-impregnated textiles through tooling. Different heating techniques may be used including conduction, convection or radiant heating. Conduction heating includes ceramic and electric resistance heating. This type of heating may in particular be used to heat the platens of a press. Convection heating may be carried out with a heat transfer fluid. Radiant heating may be carried out by infrared, microwave or induction.

In recent decades, various manufacturing methods, such as thermoplastic injection or stamping, of the thermoplastic composites have been developed.

Generally, a first step consists of manufacturing a plate or a laminate by consolidating textiles impregnated with a thermoplastic matrix or resin. In other words, the plate or the laminate is formed once the thermoplastic matrix or resin has penetrated the heart of the textiles. The stamping method then consists of shaping the plate or the laminate under high pressure and high temperature in a press and then cooling it to obtain a crystalline structure which is appropriate and decisive for the mechanical properties of the part made of composite material. However, stamping has the disadvantage of being expensive and energy intensive. Furthermore, the unmolding of the composite material is carried out hot which creates a risk of burns for the user and the cooling is performed outside the tooling which makes it difficult to control and repeat.

Document EP2349667 discloses a molding device for transforming a material, comprising:

a lower mold body, or die, made of an electrically conductive material and including a molding area intended to be in contact with the material to be transformed;

an upper mold body, or punch, made of an electrically conductive material; and including a molding area intended to be in contact with the material to be transformed;

a removable intermediate part, or core, made of an electrically conductive material, and interposed between the die and the punch;

inductive means capable of generating a magnetic field enveloping the die, the punch and the intermediate part; these three elements being electrically insulated in pairs, so that the opposing faces of the intermediate part and the die on the one hand, and of the intermediate part and the punch on the other hand, delimit two gaps in which flows the magnetic field which induces currents on the surface of the molding areas, the die and the punch, thus making it possible to localize the action of the inductors on the surface of the molding areas.

The method disclosed in document EP2349667 using the induction heating is energy intensive and complex to implement. Furthermore, the structure of the molding device, and in particular of the intermediate part, does not allow the mastery of the dimensions of the material to be transformed, the reduction of the temperature cycles and generates a heterogeneity of the material to be transformed. Indeed, the heat diffusion in the molding device is heterogeneous. Thus, the quality of the thermoplastic composites may be altered. Finally, only thin parts made of thermoplastic composites may be manufactured.

BRIEF SUMMARY

The present disclosure aims to remedy the aforementioned disadvantages by proposing a molding apparatus, a system for manufacturing quasi-finished parts made of thermoplastic composites and a method for manufacturing quasi-finished parts made of thermoplastic composites facilitating the shaping of thermoplastic pre-impregnated textiles. Furthermore, the present disclosure aims to propose a molding apparatus, a system for manufacturing quasi-finished parts made of thermoplastic composites making it possible to optimize the energy efficiency of the method for manufacturing quasi-finished parts made of thermoplastic composites. Finally, the present disclosure aims to propose a molding apparatus, a system for manufacturing quasi-finished parts made of thermoplastic composites and a method for manufacturing quasi-finished parts made of thermoplastic composites ensuring a mastery of the dimensions of the parts made of thermoplastic composites, allowing an acceleration of the warm-up, a homogenization of the temperature of the thermoplastic pre-impregnated textiles, while maintaining a high quality of the thermoplastic composites and limiting the production of waste.

The subject of the present disclosure is a molding apparatus comprising:

A first thermally conductive flange and a second thermally conductive flange, said first and second thermally conductive flanges delimiting a cavity configured to receive thermoplastic pre-impregnated textiles, A mold thermally conductive and thermoregulated by a heat transfer fluid and comprising an upper impression and a lower impression, said upper and lower impressions being configured to receive said first and second thermally conductive flanges.

The molding apparatus according to the present disclosure makes it possible to facilitate the shaping of the thermoplastic pre-impregnated textiles. Indeed, stacking of the thermoplastic pre-impregnated textiles is carried out in the cavity delimited by first and second light thermally conductive flanges whose thermal conductivity is optimized. Furthermore, the energy efficiency of the method for manufacturing thermoplastic composites is improved. Indeed, the molding apparatus makes it possible to reduce the energy necessary for its use on the one hand, thanks to the combination of the first and second thermally conductive flanges with the thermoregulated and thermally conductive mold and on the other hand, thanks to the fact that the mold is thermoregulated and thermally conductive. The mold is thermoregulated unlike the devices of the prior art in which the press is generally thermoregulated. This has the effect of concentrating the heat more quickly and more efficiently around the first and second thermally conductive flanges while avoiding heating the thick press platens which only diffuse part of the heat. The thermoregulated mold has the effect of ensuring the recrystallization of the thermoplastic composites. In addition, the thermally conductive flanges which are removable are independent of the thermoregulated and thermally conductive mold and of the press which has the advantage of a better consolidation of the thermoplastic pre-impregnated textiles while facilitating the method for manufacturing thermoplastic composites. The method for manufacturing thermoplastic composites may then be implemented on an industrial scale, particularly continuously. In addition, the first and second thermally conductive flanges and the thermoregulated and thermally conductive mold have compatible thermal expansions to ensure a mastery of the dimensions of the thermoplastic composites.

In one embodiment, said first and second thermally conductive flanges have a thermal conductivity greater than 30 $W \cdot m^{-1} \cdot K^{-1}$ and said mold thermally conductive and thermoregulated by a heat transfer fluid has a thermal conductivity greater than 30 $W \cdot m^{-1} \cdot K^{-1}$. Preferably, said first and second thermally conductive flanges have a thermal conductivity greater than 49 or greater than 55 $W \cdot m^{-1} \cdot K^{-1}$. In this embodiment, the first and second thermally conductive flanges and the thermally conductive and thermoregulated mold ensure an optimal heat transfer and guarantee a temperature homogeneity within them while maintaining an optimal quality of the thermoplastic composites.

In one embodiment, said first and second thermally conductive flanges are made of black oxide coated steel, aluminum or thermoset composite. For example, said first and second thermally conductive flanges are made of composite comprising long carbon fibers and a thermoplastic matrix made of BMI or of composite comprising cut carbon fibers and a thermoplastic matrix made of BMI such as Hextool®. Preferably, said first and second thermally conductive flanges are made of black oxide coated steel. In this embodiment, the thermal conductivity of the first and second thermally conductive flanges is optimized.

In one embodiment, said first and second thermally conductive flanges have a thickness comprised between 1 and 15 mm. Preferably, said first and second thermally conductive flanges have a thickness comprised between 1 and 10 mm and advantageously between 1 and 5 mm. In this embodiment, the thermal transfer is improved due to the low thickness of the thermally conductive flanges.

In one embodiment, said first and second thermally conductive flanges comprise removable assembly means. For example, the removable assembly means are stop screws. In this embodiment, the assembly of the first and second thermally conductive flanges ensures the maintenance and the properties of the thermoplastic pre-impregnated textiles.

In one embodiment, the assembly means delimit a gap between said first and second thermally conductive flanges. In this embodiment, it appears that the thermoplastic pre-impregnated textiles occupy the cavity delimited by the thermally conductive flanges so as to obtain a part made of thermoplastic composite having the desired dimension without the need for cutting. This arrangement ensures a complete 10 filling of the cavity defined by the two flanges because the gap is cleared during the pressing step.

In one embodiment, the thermoregulating mold is made of steel.

In one embodiment, the heat transfer fluid is chosen from: water or oil.

the subject of the present disclosure is also a system for manufacturing thermoplastic composites comprising:

The molding apparatus according to the present disclosure and

A press comprising an upper press platen on which the upper impression of the thermoregulated and thermally conductive mold is fastened and a lower press platen on which the lower impression of the thermoregulated and thermally conductive mold is fastened.

The system for manufacturing thermoplastic composites according to the present disclosure makes it possible to increase the energy efficiency of the method for manufacturing thermoplastic composites while guaranteeing a high quality of the thermoplastic composites. Indeed, the heating of the thermally conductive flanges is carried out through the thermally conductive and thermoregulated mold, which makes it possible to avoid energy losses and optimize the heat diffusion in the thermally conductive flanges.

Finally, the subject of the present disclosure is a method for manufacturing thermoplastic composites using the system for manufacturing thermoplastic composites according to the present disclosure comprising the following steps:

A. Providing thermoplastic pre-impregnated textiles comprising fibers and a thermoplastic matrix, B. Inserting the thermoplastic pre-impregnated textiles into first and second thermally conductive flanges, C. Transferring the thermally conductive flanges into a press comprising a mold thermally conductive and thermoregulated by a heat transfer fluid, D. Preheating the thermally conductive flanges through the mold in said press, E. Pressing the thermally conductive flanges, F. Transferring the thermally conductive flasks into an Infra-Red oven, G. Heating the thermally conductive flanges under Infra-Red to fuse the thermoplastic matrix, H. Transferring the thermally conductive flanges into a press comprising a mold thermally conductive and thermoregulated by a heat transfer fluid, I. Cooling the thermally conductive flanges in said press, J. Pressing the thermally conductive flanges in said press, K. Extracting the thermally conductive flanges from said press and L. Unmolding the thermoplastic composites.

The method according to the present disclosure makes it possible to increase its energy efficiency while reducing the manufacturing cycle time of the thermoplastic composites. The productivity of the method is then improved. Indeed, the molding apparatus and the system for manufacturing the thermoplastic composites make it possible to optimize the heating and cooling cycles. During preheating carried out in step D), the thermally conductive flanges and the thermoregulated and thermally conductive mold cooperate so as to increase and homogenize the heat diffusion. During the heating carried out in step G), the thermally conductive flanges are heated under Infra-Red to promote the fusion of the thermoplastic matrix of the thermoplastic pre-impregnated textiles. The molding apparatus makes it possible to control the expansion phenomena and also makes it possible to optimize the cooling carried out in step I) and thus the crystallization of the thermoplastic matrix of thermoplastic composites. During step L), the unmolding is carried out at a temperature allowing the part to be handled without risk of burns for the user. Furthermore, the method proposes quasi-finished parts made of thermoplastic composites ready for use, that is to say requiring little or no cutting. Indeed, the thermally conductive flanges are previously sized so as to obtain the desired part made of thermoplastic composite. In addition, the press(s) used in the method are conventional presses, which makes it possible to reduce the production costs. Additionally, a wide variety of thermoplastic composites may be produced quickly and efficiently. Indeed, the thermally conductive flanges may easily vary in terms of thickness, shape and patterns. The method according to the present disclosure ensures the reproducibility of the parts, is inexpensive and makes it possible to optimize the shaping of the quasi-finished parts.

For example, in step A), the thermoplastic pre-impregnated textiles comprise fibers chosen from: short or continuous fibers, natural fibers, organic or mineral fibers. For example, the fibers are chosen from: basalt fibers, carbon fibers, glass fibers. For example, in step A), the thermoplastic matrix is composed of: polyolefins, polycarbonates, polyamides, polystyrenes, polyesters and/or polyaryletherketones. For example, the thermoplastic matrix made of polyphenylene sulfide, a thermoplastic matrix made of polyethylene, a thermoplastic matrix made of poly(ethylene terephthalate).

In one embodiment, in step D), the preheating of the mold is carried out by convection or by conduction. The conduction heating includes ceramic and electric resistance heating. Convection heating may be carried out with a heat transfer fluid. In this embodiment, the thermal diffusion is improved.

In one embodiment, in step D), the preheating of the mold is carried out at a temperature comprised between 50 and 150° C. Unlike the prior art in which the presses are generally heated to temperatures around 350° C., it seems that in this embodiment the thermally conductive flanges and the thermally conductive and thermoregulated mold manage to optimize the energy efficiency in particular by considerably reducing the preheating temperature. Indeed, the thermally conductive mold is heated so as to diffuse the heat towards the thermally conductive flanges which has the effect of increasing the heat transfer without energy loss.

In one embodiment, in step D), the preheating is carried out for 1 to 10 min. In this embodiment, it seems that the heat diffusion with the molding apparatus is effective, which has the effect of reducing the heating time and thus increasing the productivity while optimizing the energy efficiency.

In one embodiment, in steps E) and/or J), the pressing is carried out at a pressure comprised between $10.10^6$ and $60.10^6$ Pa.

In one embodiment, the method comprises a step M) carried out after step E) or after step J) including the vacuuming of the first and second thermally conductive flanges. In this embodiment, the vacuuming makes it possible to improve the penetration of the thermoplastic matrix molten into the fibers. Furthermore, the vacuuming makes it possible to maintain the orientation of the fibers included in the thermoplastic pre-impregnated textiles, to avoid the oxidation of the thermoplastic matrix, to evacuate possible contaminations and to avoid the delamination of the thermoplastic pre-impregnated textiles during shaping. Finally, the vacuuming maintains the thermoplastic matrix fluidized.

In one embodiment, a seal is inserted between said first and second thermally conductive flanges. For example, the seal is thermoresistant. For example, the seal has a compression factor comprised between 0.1 and 10 mm, preferably between 0.1 and 5 mm, and advantageously between 0.1 and 3 mm.

In one embodiment, in step G), the first and second thermally conductive flanges are heated at the melting temperature of the thermoplastic matrix of the thermoplastic pre-impregnated textiles.

In one embodiment, in step G), the heating of the first and second thermally conductive flanges is carried out for 5 to 15 min. In this embodiment, the preheating step D) and the thermally conductive flanges make it possible to reduce the heating time.

In one embodiment, in step I), the first and second thermally conductive flanges are cooled at a temperature at least 10° C. lower than the glass transition temperature of the thermoplastic matrix. In this embodiment, the user may handle the first and second thermally conductive flanges without any risk of burns.

In one embodiment, in step I), the cooling is carried out for 1 to 10 min.

In one embodiment, the thermoplastic pre-impregnated textiles comprise electronic components based on inorganic compounds or organic compounds. For example, the electronic components are chosen from: a near-field communication tag or a radio-identification tag. In this embodiment, the thermoplastic composites may be easily traced by the user.

In one embodiment, a single press is used during steps C) and H). In other words, the same press is used in steps C) and H).

In one embodiment, two separate presses are used during steps C) and H). In other words, a first press is used during step C) and a second press is used during step H). In this embodiment, the method makes it possible to manufacture parts continuously on an industrial scale.

BRIEF DESCRIPTION OF THE DRAWINGS

The present disclosure will be better understood, thanks to the description below, which relates to one or more embodiments according to the present disclosure, given by way of non-limiting examples and explained with reference to the appended schematic drawings, in which.

DETAILED DESCRIPTION

Figure 1:
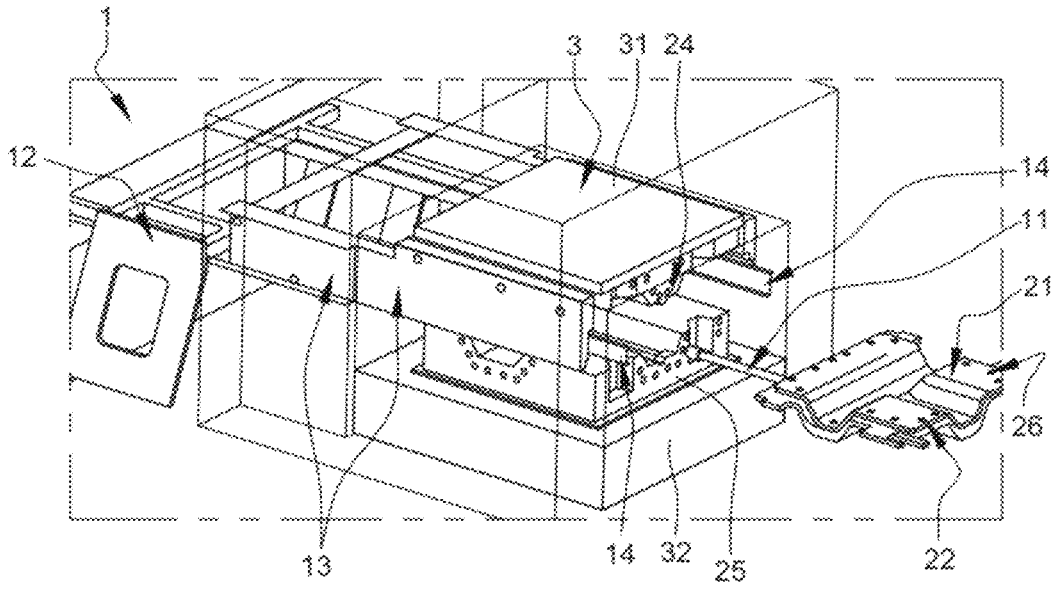
FIG. 1 is an overview of a system for manufacturing thermoplastic composites according to the present disclosure.
Figure 2:
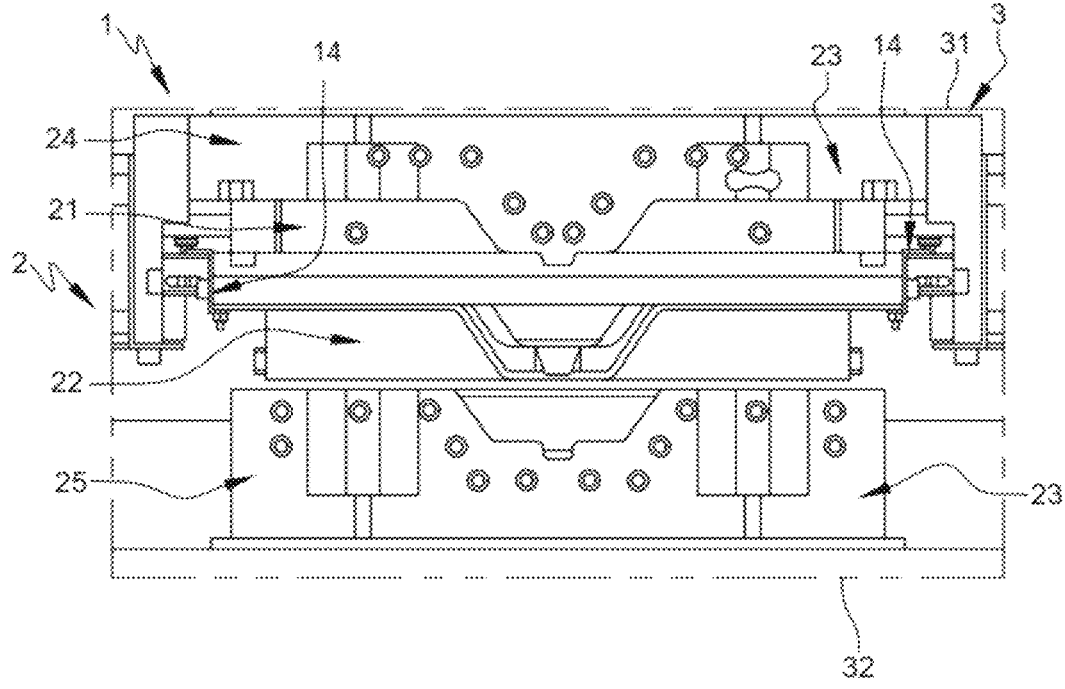
FIG. 2 is a side view of a system for manufacturing thermoplastic composites according to the present disclosure.

FIGS. 1 and 2 illustrate a system 1 for manufacturing thermoplastic composites comprising:

A molding apparatus 2 and

A press 3 comprising an upper press platen 31 and a lower press platen 32.

The molding apparatus 2 comprises a first thermally conductive flange 21 and a second thermally conductive flange 22, said first 21 and second 22 thermally conductive flanges delimiting a cavity configured to receive thermoplastic pre-impregnated textiles. The first 21 and second 22 thermally conductive flanges have a thermal conductivity greater than 30 $W \cdot m^{-1} \cdot K^{-1}$ and preferably greater than 49 or greater than 55 $W \cdot m^{-1} \cdot K^{-1}$.

The first 21 and second 22 thermally conductive flanges are for example made of black oxide coated steel, aluminum or thermoset composite. Preferably, said first and second thermally conductive flanges are made of black oxide coated steel, which has the effect of increasing the thermal conductivity.

The molding apparatus 2 further comprises a thermoregulated and thermally conductive mold 23 comprising an upper impression 24 and a lower impression 25 and having a thermal conductivity greater than 30 $W \cdot m^{-1} \cdot K^{-1}$, said upper 24 and lower 25 impressions being configured to receive said first 21 and second 22 thermally conductive flanges.

For example, the first 21 and second 22 thermally conductive flanges have a thickness comprised between 1 and 15 mm. Thus, the thermally conductive flanges are light and have an improved thermal conductivity.

The first 21 and second 22 thermally conductive flanges may comprise removable assembly means. For example, the removable assembly means are stop screws 26.

The thermoregulated and thermally conductive mold 23 is preferably made of steel. The thermoregulated and thermally conductive mold 23 is preferably regulated through a heat transfer fluid, for example water.

The upper impression 24 of the thermoregulated and thermally conductive mold 23 is fastened on the upper press platen 31 of the press 3 and the lower impression 25 of the thermoregulated and thermally conductive mold 23 is fastened on the lower press platen 32. The first 21 and second 22 thermally conductive flanges are removable, that is to say independent of the thermoregulated and thermally conductive mold 23 and of the press 3.

In this example, the system 1 comprises a vacuum device 11.

In this example, the system 1 further comprises a transfer frame 12 which makes it possible to transfer the first 21 and second 22 thermally conductive flanges, lateral guide supports 13 on which are fastened guide rails 14 which make it possible to guide the first 21 and second 22 thermally conductive flanges and the transfer frame 12.

The method for manufacturing thermoplastic composites using the system 1 for manufacturing thermoplastic composites comprises a step A) in which thermoplastic pre-impregnated textiles comprising fibers and a thermoplastic matrix are provided.

Figure 3:
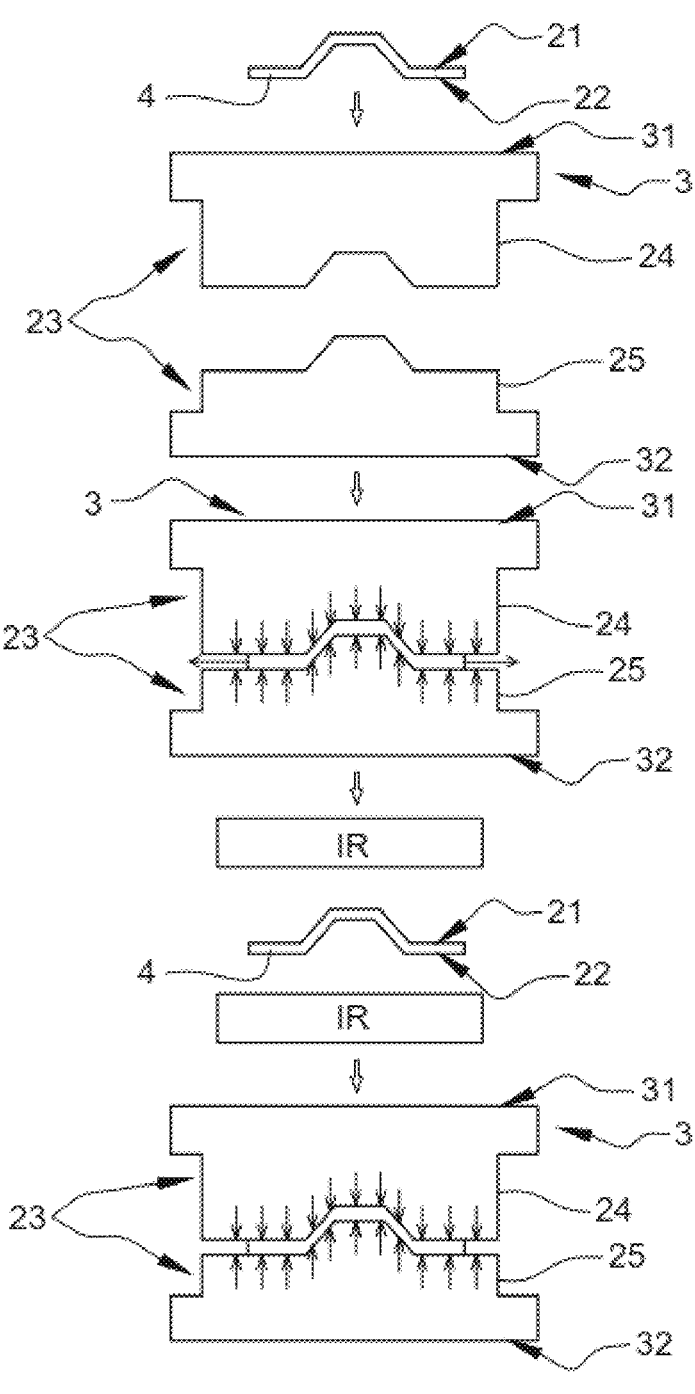
FIG. 3 is a schematic view of the method for manufacturing thermoplastic composites according to the present disclosure.
Figure 4:
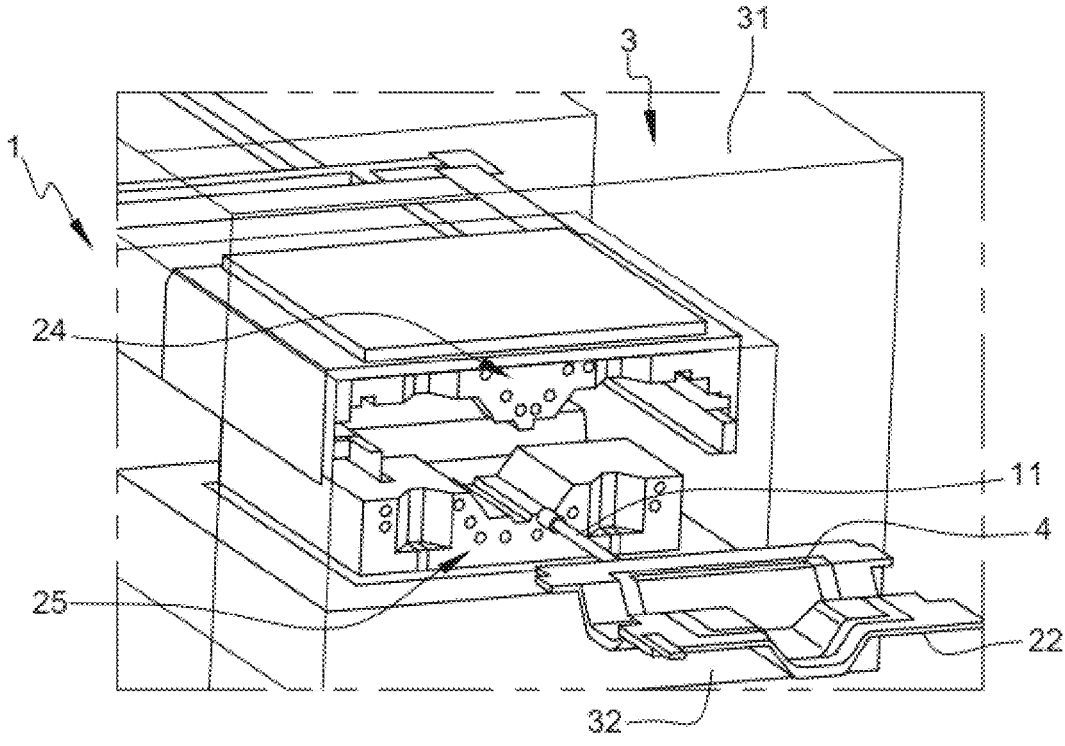
FIG. 4 is an overview of part of the method for manufacturing thermoplastic composites according to the present disclosure.
Figure 5:
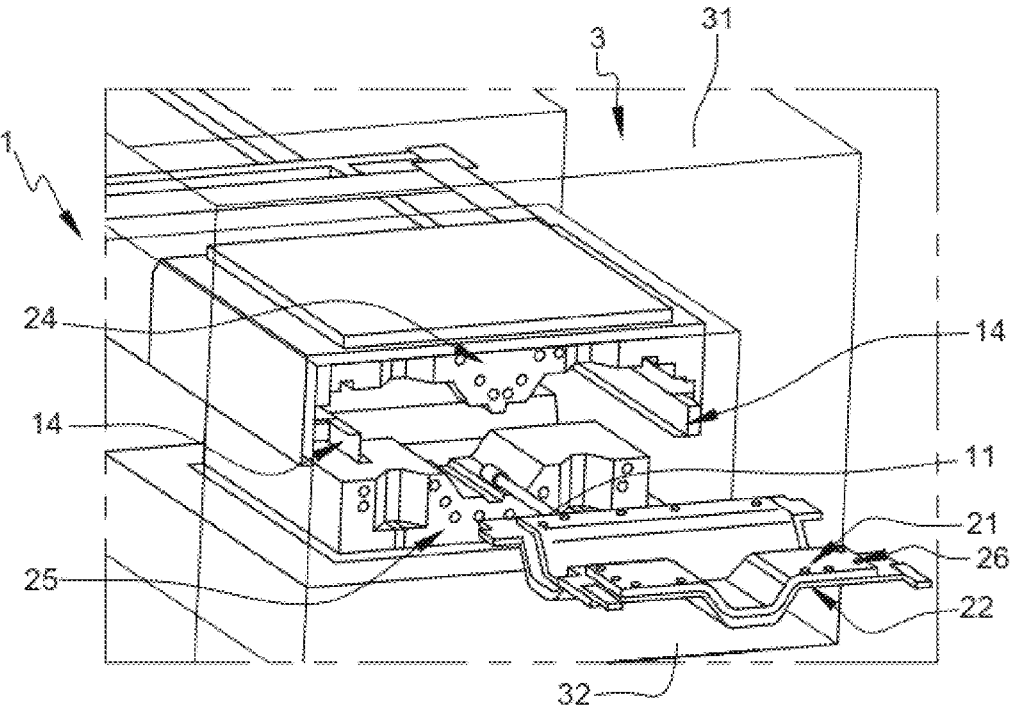
FIG. 5 is an overview of part of the method for manufacturing thermoplastic composites according to the present disclosure.

FIGS. 3 and 4 illustrate step B) in which the thermoplastic pre-impregnated textiles 4 are inserted into the first 21 and second 22 thermally conductive flanges. For this purpose, the thermoplastic pre-impregnated textiles 4 may be deposited on the second thermally conductive flange 22. The first flange 21 may then be deposited on the second thermally conductive flange 22 so as to delimit a cavity configured to receive the thermoplastic pre-impregnated textiles 4. The first 21 and second 22 thermally conductive flanges may then be assembled with stop screws 26 (FIG. 5).

For example, in step A), the thermoplastic pre-impregnated textiles 4 comprise fibers chosen from: short or continuous fibers, natural fibers, organic or mineral fibers. For example, the fibers are chosen from: basalt fibers, carbon fibers, glass fibers. For example, in step A), the thermoplastic matrix is composed of: polyolefins, polycarbonates, polyamides, polystyrenes, polyesters and/or polyaryletherketones. For example, thermoplastic matrix made of polyphenylene sulfide, thermoplastic matrix made of polyethylene, thermoplastic matrix made of poly(ethylene terephthalate).

Figure 6:
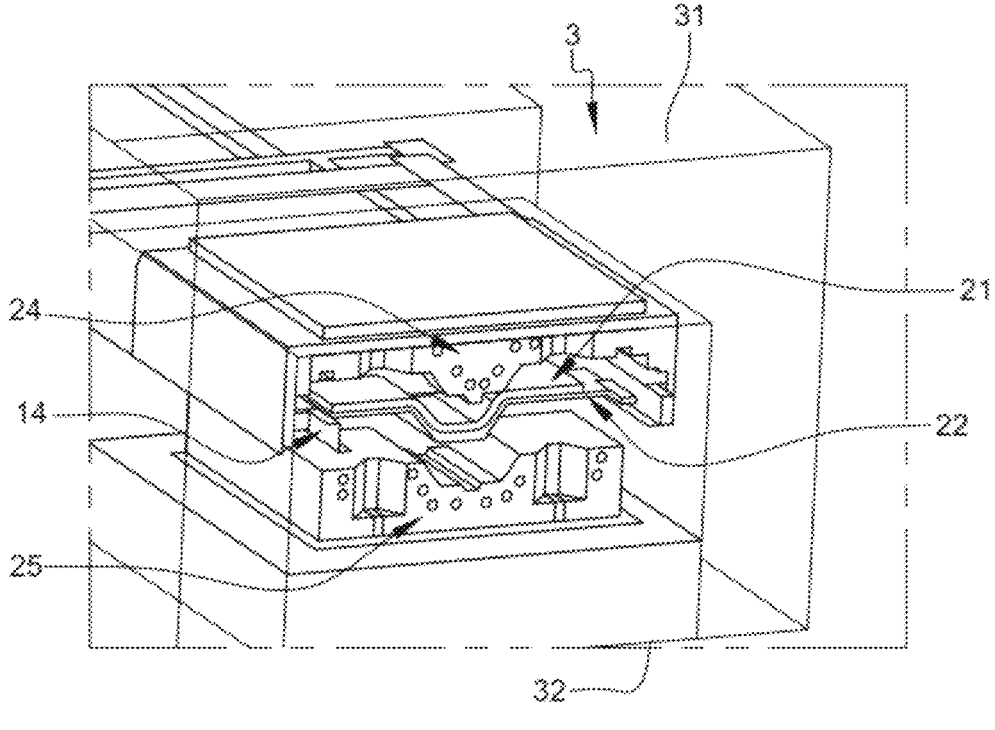
FIG. 6 is an overview of part of the method for manufacturing thermoplastic composites according to the present disclosure.

FIG. 6 illustrates step C) in which the first 21 and second 22 thermally conductive flanges are transferred into the press 3. For this purpose, the first 21 and second 22 thermally conductive flanges being disposed on the rails 14.

Figure 7:
FIG. 7 is an overview of part of the method for manufacturing thermoplastic composites according to the present disclosure.
Figure 7:
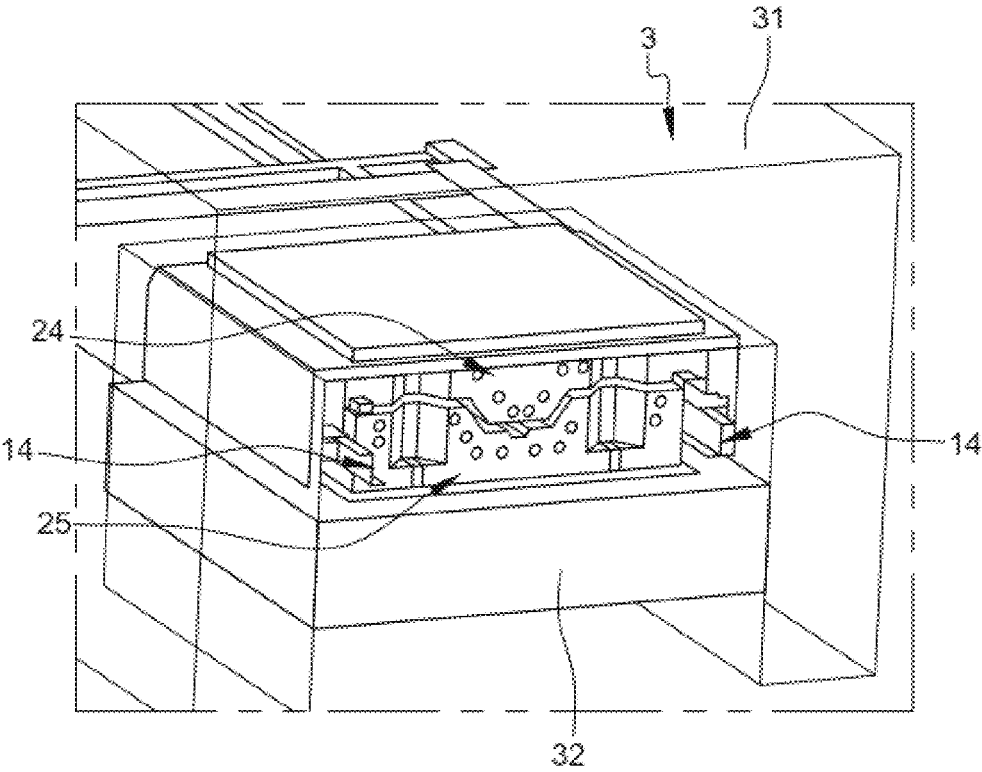

FIGS. 3 and 7 illustrate step D) in which the first 21 and second 22 thermally conductive flanges are preheated through the mold 23 in said press 3. The preheating of the mold 23 may be carried out by convection or by conduction at a temperature comprised between 50 and 150° C. and for example at a temperature of 100° C. The preheating may be carried out for 1 to 10 min and for example, for 5 min.

FIGS. 3 and 7 also illustrate step E) in which the first 21 and second 22 thermally conductive flanges are pressed. The pressing may be carried out at a pressure comprised between $10.10^6$ and $60.10^6$ Pa and for example at a pressure equal to $15.10^6$ Pa.

FIG. 7 also illustrates step M) which may be carried out after step E) including the vacuuming of the first 21 and second 22 thermally conductive flanges using the vacuuming device 11. For example, a thermoresistant seal is inserted between said first 21 and second 22 thermally conductive flanges. The seal may have a compression factor comprised between 0.1 and 3 mm and for example a compression factor of 1.5 mm.

Figure 8:
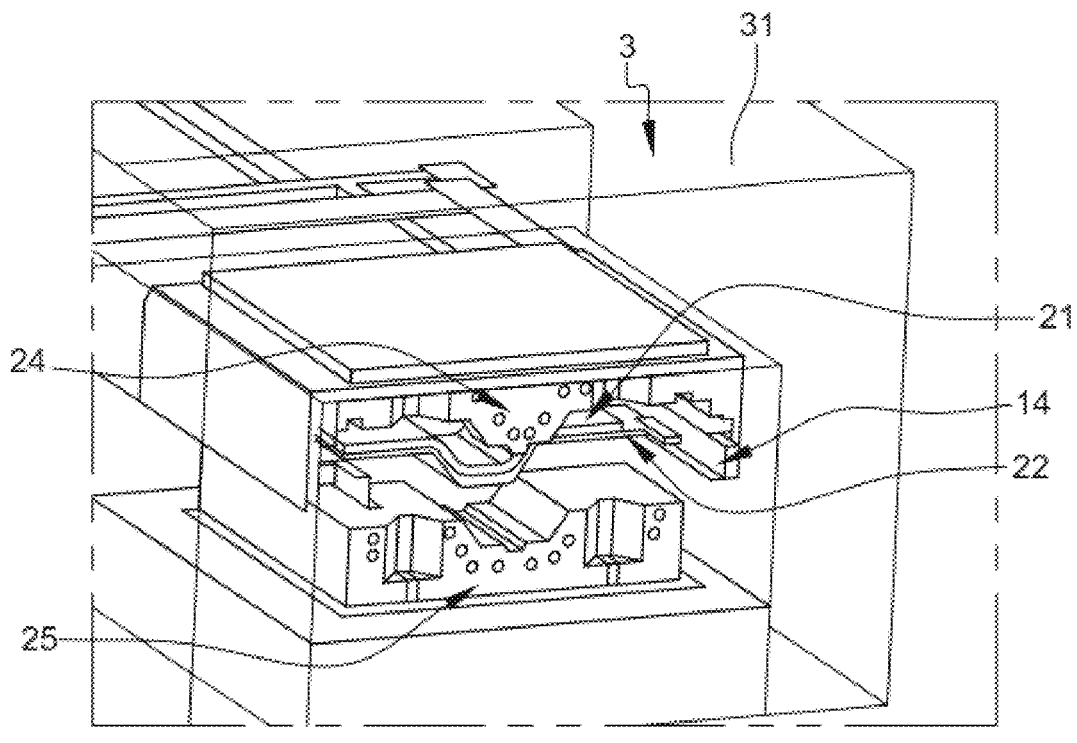
FIG. 8 is an overview of part of the method for manufacturing thermoplastic composites according to the present disclosure.

FIG. 8 illustrates the opening of the press 3. The first 21 and second 22 thermally conductive flanges may then be disposed on the transfer frame 12 (FIG. 1). In a step F), the first 21 and second 22 thermally conductive flanges are transferred into an Infra-Red IR oven.

Figure 9:
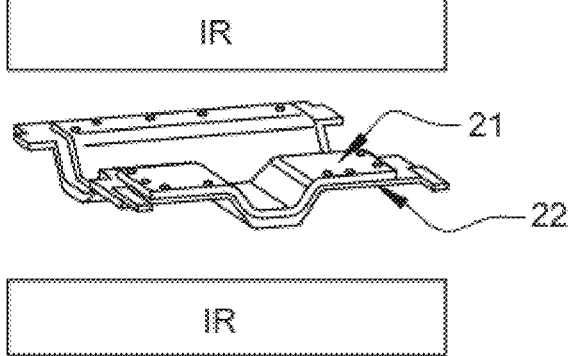
FIG. 9 is an overview of part of the method for manufacturing thermoplastic composites according to the present disclosure.

FIGS. 3 and 9 illustrate step G) in which the first 21 and second 22 thermally conductive flanges are heated in an Infra-Red IR oven. For example, the first 21 and second 22 thermally conductive flanges are heated at the melting temperature of the thermoplastic matrix of the thermoplastic pre-impregnated textiles. The heating of the first 21 and second 22 thermally conductive flanges may be carried out for 5 to 15 min or for example for 8 min.

Figure 10:
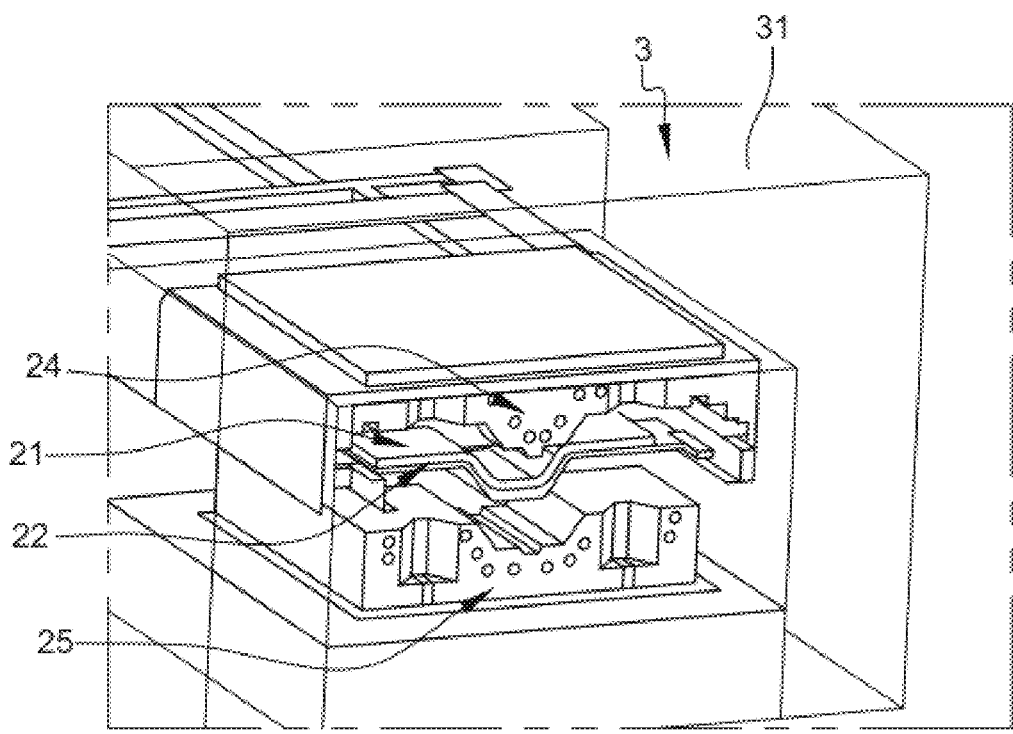
FIG. 10 is an overview of part of the method for manufacturing thermoplastic composites according to the present disclosure.

FIG. 10 illustrates the opening of the press 3. The first 21 and second 22 thermally conductive flanges may then be disposed on the transfer frame 12 (FIG. 1). In a step H), the first 21 and second 22 thermally conductive flanges are transferred into the press 3.

Figure 11:
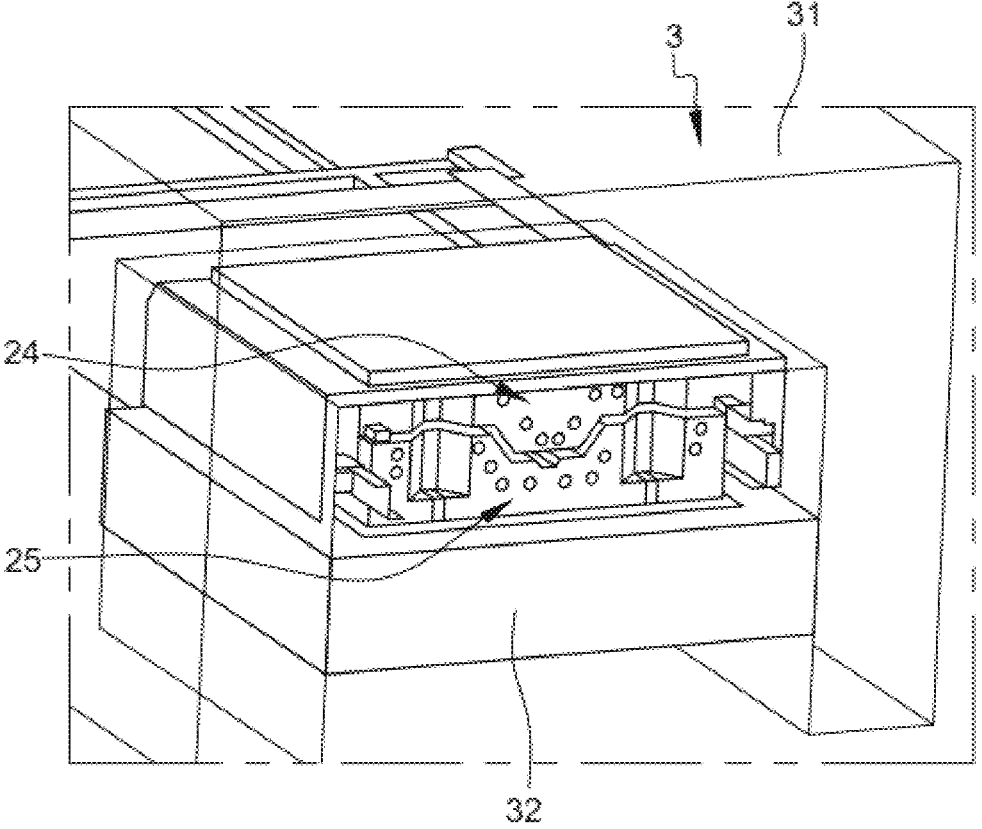
FIG. 11 is an overview of part of the method for manufacturing thermoplastic composites according to the present disclosure.

FIGS. 3 and 11 illustrate step I) in which the first 21 and second 22 thermally conductive flanges are cooled. For example, the first 21 and second 22 thermally conductive flanges are cooled at a temperature at least 10° C. lower than the glass transition temperature of the thermoplastic matrix. The cooling may be carried out for 1 to 10 min or for example for 6 min.

FIGS. 3 and 11 also illustrate step J) in which the first 21 and second 22 thermally conductive flanges are pressed. The pressing may be carried out at a pressure comprised between $10.10^6$ and $60.10^6$ Pa and for example at a pressure equal to $15.10^6$ Pa.

FIG. 11 also illustrates step M) which may be carried out after step J) including the vacuuming of the first 21 and second 22 thermally conductive flanges using the vacuuming device 11. For example, a thermoresistant seal is inserted between said first 21 and second 22 thermally conductive flanges. The seal may have a compression factor comprised between 0.1 and 3 mm and for example a compression factor of 1.5 mm.

Figure 12:
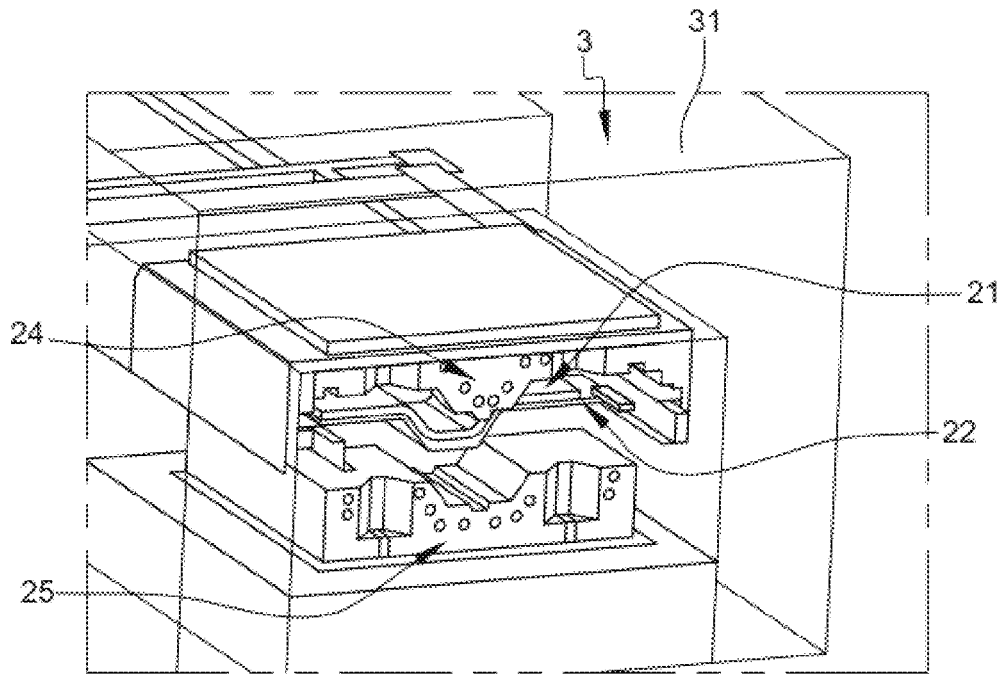
FIG. 12 is an overview of part of the method for manufacturing thermoplastic composites according to the present disclosure and FIG. 13 is an overview of part of the method for manufacturing thermoplastic composites according to the present disclosure.

FIG. 12 illustrates the opening of the press 3 when the cooling is complete.

Figure 13:
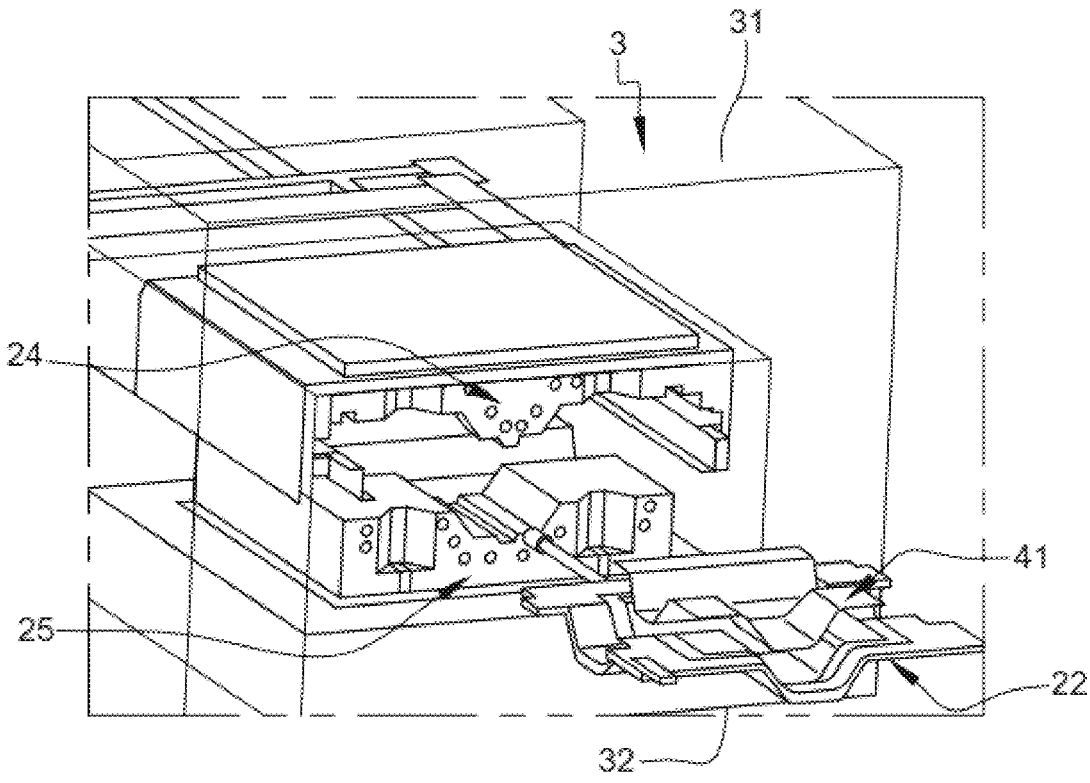

FIG. 13 illustrates step K) in which the first 21 and second 22 thermally conductive flanges are extracted from the press 3. After removing the first thermally conductive flange 21, the thermoplastic composites 41 may be unmolded. For example, the thickness of the part made of thermoplastic composite is comprised between 1 and 50 mm, preferably between 1 and 10 mm and is for example 2 mm.

When implementing the method according to the present disclosure, two separate presses may be used during steps C) and H).

The molding apparatus according to the present disclosure facilitates the shaping of the thermoplastic pre-impregnated textiles. Furthermore, the energy efficiency of the method for manufacturing thermoplastic composites is improved. In addition, the removable thermally conductive flanges allow a better consolidation of the thermoplastic pre-impregnated textiles while facilitating the method for manufacturing thermoplastic composites. The method for manufacturing thermoplastic composites may be implemented on an industrial scale, particularly continuously. In addition, the first and second thermally conductive flanges and the thermoregulated and thermally conductive mold have compatible thermal expansions to ensure a mastery of the dimensions of the thermoplastic composites. Finally, the first and second thermally conductive flanges ensure an optimal heat transfer and guarantee a temperature homogeneity within them while maintaining an optimal quality of the thermoplastic composites.

The invention claimed is:

1. A method for manufacturing thermoplastic composites using a system for manufacturing thermoplastic composites comprising:

a molding apparatus comprising a first thermally conductive flange and a second thermally conductive flange, said first and second thermally conductive flanges delimiting a cavity configured to receive thermoplastic pre-impregnated textiles, and a mold thermally conductive and thermoregulated by a heat transfer fluid comprising an upper impression and a lower impression, said upper and lower impressions being configured to receive said first and second thermally conductive flanges, and at least one press comprising an upper press platen on which the upper impression of the thermoregulated and thermally conductive mold is fastened and a lower press platen on which the lower impression of the thermoregulated and thermally conductive mold is fastened the method for manufacturing thermoplastic composites comprising the following steps:

A. Providing thermoplastic pre-impregnated textiles comprising fibers and a thermoplastic matrix, B. Inserting the thermoplastic pre-impregnated textiles into first and second thermally conductive flanges, C. Transferring the thermally conductive flanges into a first press of said at least one press comprising a mold thermally conductive and thermoregulated by a heat transfer fluid, D. Preheating the thermally conductive flanges through the mold in said first press, E. Pressing the thermally conductive flanges, F. Transferring the thermally conductive flanges into an Infra-Red (IR) oven, G. Heating the thermally conductive flanges under Infra-Red to fuse the thermoplastic matrix, H. Transferring the thermally conductive flanges into a second press of said at least one press comprising a mold thermally conductive and thermoregulated by a heat transfer fluid, wherein the first press and the second press are the same press or separate presses, I. Cooling the thermally conductive flanges in said second press, J. Pressing the thermally conductive flanges in said press, K. Extracting the thermally conductive flanges from said press and L. Unmolding the thermoplastic composites.

2. The method for manufacturing thermoplastic composites according to claim 1, wherein in step D), the preheating of the mold is carried out by convection or by conduction.

3. The method for manufacturing thermoplastic composites according to claim 1, wherein in step D), the preheating of the mold is carried out at a temperature comprised between 5° and 150° C.

4. The method for manufacturing thermoplastic composites according to claim 1, wherein in steps E) and/or J), the pressing is carried out at a pressure comprised between $10^7$ and $6.10^7$ Pa.

5. The method for manufacturing thermoplastic composites according to claim 1, comprising a step M) carried out after step E) or J), including vacuuming the first and second thermally conductive flanges.

6. The method for manufacturing thermoplastic composites according to claim 5, wherein a seal is inserted between said first and second thermally conductive flanges.

7. The method for manufacturing thermoplastic composites according to claim 1, wherein in step G), the first and second thermally conductive flanges are heated at a melting temperature of the thermoplastic matrix of the thermoplastic pre-impregnated textiles.

8. The method for manufacturing thermoplastic composites according to claim 1, wherein in step I), the first and second thermally conductive flanges are cooled at a temperature at least 10° C. lower than a glass transition temperature of the thermoplastic matrix.

9. The method for manufacturing thermoplastic composites according to claim 1, wherein the thermoplastic pre-impregnated textiles comprise electronic components based on inorganic compounds or organic compounds.

10. The method for manufacturing thermoplastic composites according to claim 1, wherein said first and second thermally conductive flanges have a thermal conductivity greater than 30 $W \cdot m^{-1} \cdot K^{-1}$ and said mold thermally conductive and thermoregulated by a heat transfer fluid has a thermal conductivity greater than 30 $W \cdot m^{-1} \cdot K^{-1}$.

11. The method for manufacturing thermoplastic composite according to claim 1, wherein said first and second thermally conductive flanges are made of black oxide coated steel, aluminum or thermoset composite.

12. The method for manufacturing thermoplastic composites according to claim 1, wherein said first and second thermally conductive flanges comprise removable assembly means.

13. The method for manufacturing thermoplastic composites according to claim 2, wherein in step D), the preheating of the mold is carried out at a temperature comprised between 5° and 150° C.

14. The method for manufacturing thermoplastic composites according to claim 13, wherein in steps E) and/or J), the pressing is carried out at a pressure comprised between $10^7$ and $6.10^7$ Pa.

15. The method for manufacturing thermoplastic composites according to claim 14, comprising a step M) carried out after step E) or J), including vacuuming the first and second thermally conductive flanges.

16. The method for manufacturing thermoplastic composites according to claim 15, wherein a seal is inserted between said first and second thermally conductive flanges.

17. The method for manufacturing thermoplastic composites according to claim 16, wherein in step G), the first and second thermally conductive flanges are heated at a melting temperature of the thermoplastic matrix of the thermoplastic pre-impregnated textiles.

18. The method for manufacturing thermoplastic composites according to claim 17, wherein in step I), the first and second thermally conductive flanges are cooled at a temperature at least 10° C. lower than a glass transition temperature of the thermoplastic matrix.

19. The method for manufacturing thermoplastic composites according to claim 18, wherein the thermoplastic pre-impregnated textiles comprise electronic components based on inorganic compounds or organic compounds.

20. The method for manufacturing thermoplastic composites according to claim 19, wherein said first and second thermally conductive flanges have a thermal conductivity greater than 30 $W \cdot m^{-1} \cdot K^{-1}$ and said mold thermally conductive and thermoregulated by a heat transfer fluid has a thermal conductivity greater than 30 $W \cdot m^{-1} \cdot K^{-1}$.

* * * * *